(12) United States Patent
Dehne et al.

(10) Patent No.: US 8,511,245 B2
(45) Date of Patent: Aug. 20, 2013

(54) HELICAL STRAKE SYSTEMS

(75) Inventors: Julie Ann Dehne, Cypress, TX (US); William Andrew West, Friendswood, TX (US); Donald Wayne Allen, Richmond, TX (US); Philip Albert Larson, La Mirada, CA (US); Dean Leroy Henning, Richmond, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 13/274,207

(22) Filed: Oct. 14, 2011

(65) Prior Publication Data
US 2012/0291687 A1    Nov. 22, 2012

Related U.S. Application Data

(60) Provisional application No. 61/486,737, filed on May 16, 2011.

(51) Int. Cl.
*F15D 1/10* (2006.01)
(52) U.S. Cl.
USPC .......................................................... 114/243
(58) Field of Classification Search
USPC ........................................ 114/243; 405/216
See application file for complete search history.

(56) References Cited

U.S. PATENT DOCUMENTS

| 3,472,196 | A | * | 10/1969 | Ewing et al. | 114/243 |
| 3,671,348 | A | * | 6/1972 | Kemsey-Bourne | 156/187 |
| 4,365,574 | A | * | 12/1982 | Norminton | 114/243 |
| 4,640,673 | A | * | 2/1987 | Takeda et al. | 425/297 |
| 6,347,911 | B1 | | 2/2002 | Blair et al. | |
| 6,755,595 | B2 | * | 6/2004 | Oram | 405/216 |
| 6,896,447 | B1 | * | 5/2005 | Taquino | 405/216 |
| 7,458,752 | B2 | * | 12/2008 | Esselbrugge et al. | 405/216 |
| 2006/0280559 | A1 | * | 12/2006 | Allen et al. | 405/216 |
| 2008/0236469 | A1 | * | 10/2008 | Masters et al. | 114/243 |
| 2009/0185867 | A1 | | 7/2009 | Masters et al. | |

FOREIGN PATENT DOCUMENTS

| GB | 2335248 | 9/1999 |
| GB | 2362444 | 11/2001 |
| WO | WO-2005026560 | 3/2005 |
| WO | WO-2009070483 | 6/2009 |

OTHER PUBLICATIONS

Viv Solutions LLC, European search report dated Sep. 26, 2012 for EP Appln. No. 12168141.5.

* cited by examiner

*Primary Examiner* — Stephen Avila
(74) *Attorney, Agent, or Firm* — Blakely Sokoloff Taylor & Zafman LLP

(57) ABSTRACT

An apparatus including a strake section having a plurality of helical fins separated by at least one helical opening. A method including forming a helically shaped fin that independently maintains the helical shape once formed.

17 Claims, 16 Drawing Sheets

HELICAL STRAKE SYSTEMS

CROSS-REFERENCE TO RELATED APPLICATION

The application claims the benefit of the earlier filing date of U.S. Provisional Patent Application No. 61/486,737, filed May 16, 2011 and incorporated herein by reference.

FIELD

A helical strake system for reducing vortex-induced vibration of tubulars.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections.

One solution is to install helical strakes onto the tubular. Typically, helical strakes are made by installing fins helically around a cylindrical shell. The cylindrical shell may be separated into two halves and positioned around the tubular to helically arrange the fins around the underlying tubular. Helical strakes, if properly designed, can reduce the VIV fatigue damage rate of a tubular in an ocean current.

There are some important installation issues and challenges associated with helical strakes. Surface installation requires human intervention to mechanically install the helical strake sections around the tubular. This installation can be time consuming and expensive, since the daily cost of installation vessels are quite high.

Installation of helical strakes in the ocean can be both difficult and extremely expensive. It is critical that high precision be present in the strake design so that opposite sides of the helical strake align properly when attaching a helical strake section around a tubular.

Another issue with helical strakes is the thermal and electrical insulation that they impart onto a tubular. Sometimes helical strakes having fins attached to a cylindrical shell provide more thermal insulation around the tubular than desired. Other times, helical strakes impede cathodic protection systems.

DETAILED DESCRIPTION

Figure 1A:
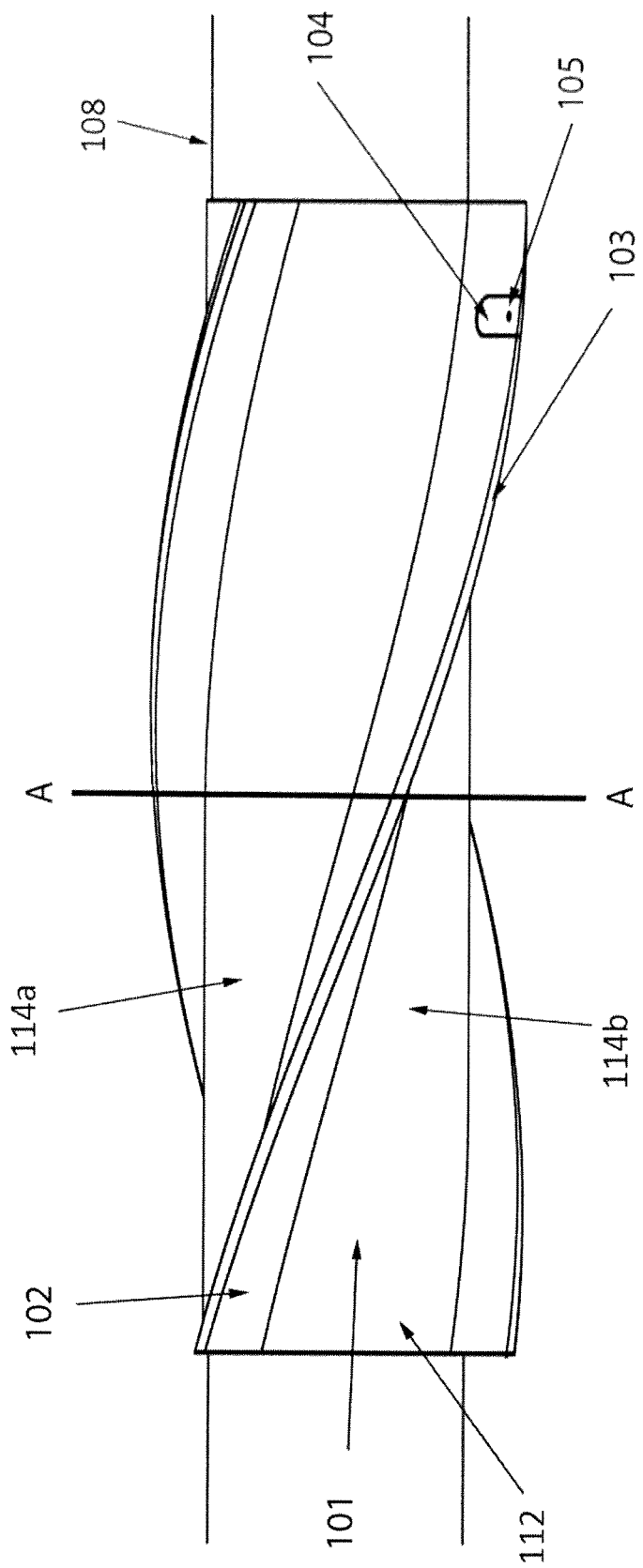
FIG. 1A is a side view of an embodiment of a helical strake section.

FIG. 1A shows a helical strake section 101 with strake fins 102 extending from strake sleeve 112. Strake sleeve 112 with strake fins 102 attached thereto includes first side 114a and second side 114b which can be separted along opening 103 so that helical strake section 101 can be placed around tubular 108. In this embodiment, opening 103 is helically formed along a longitudinal dimension of one of fins 102. Strake sleeve 112 may have a substantially cylindrical shape. In some embodiments, strake sleeve 112 may have an inner diameter substantially the same as or slightly larger than tubular 108 or other underlying structure such that it fits around the tubular 108 or other structure. In the illustrated embodiment, fins 102 have a substantially triangular cross-sectional shape, however, other shapes may be suitable (e.g. circular, square, etc.)

Fins 102 are important for providing effective suppression of VIV by disrupting the normal flow around tubular 108. Once helical strake section 101 is placed around tubular 108 or other structure, it should be fastened or fixed in some manner to insure that it does not come off of tubular 108 while in service. In one embodiment, fastener 105 is used to attach adjacent sides 114a, 114b of section 101 together to keep helical strake section 101 in place around tubular 108. Any number of fasteners 105 may be used to attach sides 114a, 114b of strake section 101 together, and any suitable fastener 105, or combination of fasteners, may be utilized, including bolts, nuts, screws, clamps, rivets, pins, or hooks.

Optional reinforcement member 104 can be used to provide structural integrity around the attachment area and to provide openings that are pre-aligned for fastening sides 114a, 114b of section 101 together. Reinforcement member 104 may be, for example, a plastic or metal piece mounted to one of fins 102 to provide added thickness at the attachment point for fastener 105. Reinforcement member 104 may be of any suitable geometry to provide structural integrity and/or to align sides 114a, 114b of strake section 101 together.

Still referring to FIG. 1A, helical strake section 101 may be of any suitable length, but will typically be from about 4 feet to about 10 feet long. Strake fins 102 may be of any suitable height but will typically range from about 5 to about 50 percent of the tubular diameter, with 20 to 30 percent being the most common height range. The pitch of strake fins 102 may be of any suitable pitch, for example, within a range of from about 5 to about 25 times the tubular diameter, with 10-20 times the tubular diameter being most common. The number of fins may vary from about 1 to about 8, preferably from 3 to 4.

Strake sleeve 112 and fins 102 may be made of any suitable material including, but not limited to, plastic, fiberglass, wood, metal, or synthetics such as rubber or fiber. Strake sleeve 112 and fins 102 may be made of the same or different materials. In some embodiments, strake sleeve 112 having fins 102 extending therefrom may be integrally formed as one piece. For example, strake sleeve 112 may be formed with fins 102 by an extrusion process that sets the helix of fins 102 as the material is drawn through the die. The helix may be set by the die by, for example, rotating the starting material as it is drawn through the die so that a desired helical angle is achieved. Since the helix of fins 102 is formed by the extrusion process, a low cost material (e.g. plastic) as opposed to a more expensive material (e.g. polyurethane) can be used to form strake section 101. In addition, manufacturing time is reduced because fewer manufacturing steps are required. Typically, the fins of helical strake sections are formed separately as straight pieces using a flexible material such as polyurethane. The fins are then helically wound around and attached to a preformed strake sleeve. Manufacturing costs as well as time may be high due to the materials used and added steps. Extruding strake section 101 as discussed above significantly reduces these costs. Although an extrusion process is preferred, other suitable processes for integrally forming strake sleeve 112 with fins 102 may include an injection molding process, vacuum forming process or other similar process. Opening 103 may be molded into helical strake section 101 or formed by a cutting operation after section 101 is formed. It is noted, however, that in some embodiments, opening 103 may be omitted as discussed in more detail in reference to FIG. 5 and FIG. 6.

Alternatively, strake sleeve 112 and fins 102 may be formed separately using any of the above-discussed molding techniques and attached to one another using any conventional attachment mechanism (e.g. bolts). Opening 103 may be molded into helical strake section 101 or formed by a cutting operation.

Optional reinforcement members 104 may be molded or formed into helical strake section 101 or added separately. Fins 102 and strake sleeve 112 may be coated or embedded with particles that resist marine fouling (e.g. copper). Fins 102 and strake sleeve 112 may have appurtenances or coatings that assist with operation or temporary placement of them on the seabed, for example fins 102 and sleeve 112 may be coated with Intersleek™, which slows the development of marine growth. Still further, strake sleeve 112 may have openings or gaps, in addition to support structures between the section and the tubular, which allows for water to pass or reside between the section and the tubular.

Figure 1B:
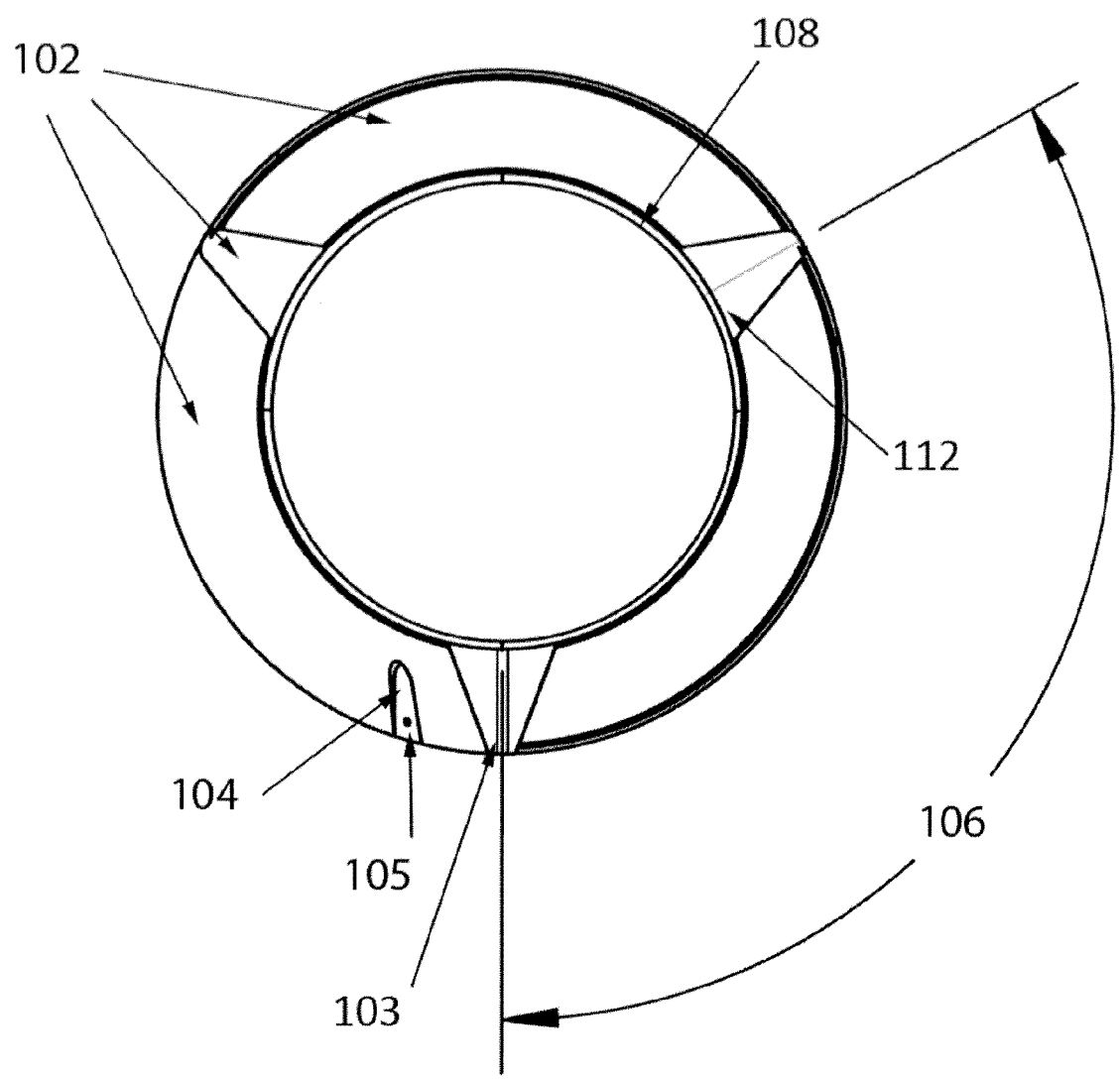
FIG. 1B is an end view of the helical strake section illustrated in FIG. 1A.

Referring to FIG. 1B, this figure is an end view of FIG. 1A which shows a helical strake section 101 with strake fins 102 extending from strake sleeve 112. Helical strake section 101 has opening 103 that allows it to be placed around a tubular. Reinforcement member 104 gives strength to the area where fastener 105 tightens helical strake section 101 around tubular 108. Fins 102 may be separated by an angle 106. Angle 106 may be substantially equal for each adjacent pair of fins 102 or it may be different for each pair of adjacent fins 102. Angle 106 may vary from 10 to 360 degrees. For example, angle 106 may vary from approximately 90 to 120 degrees, with an angle of 120 degrees being most preferable.

Figure 1C:
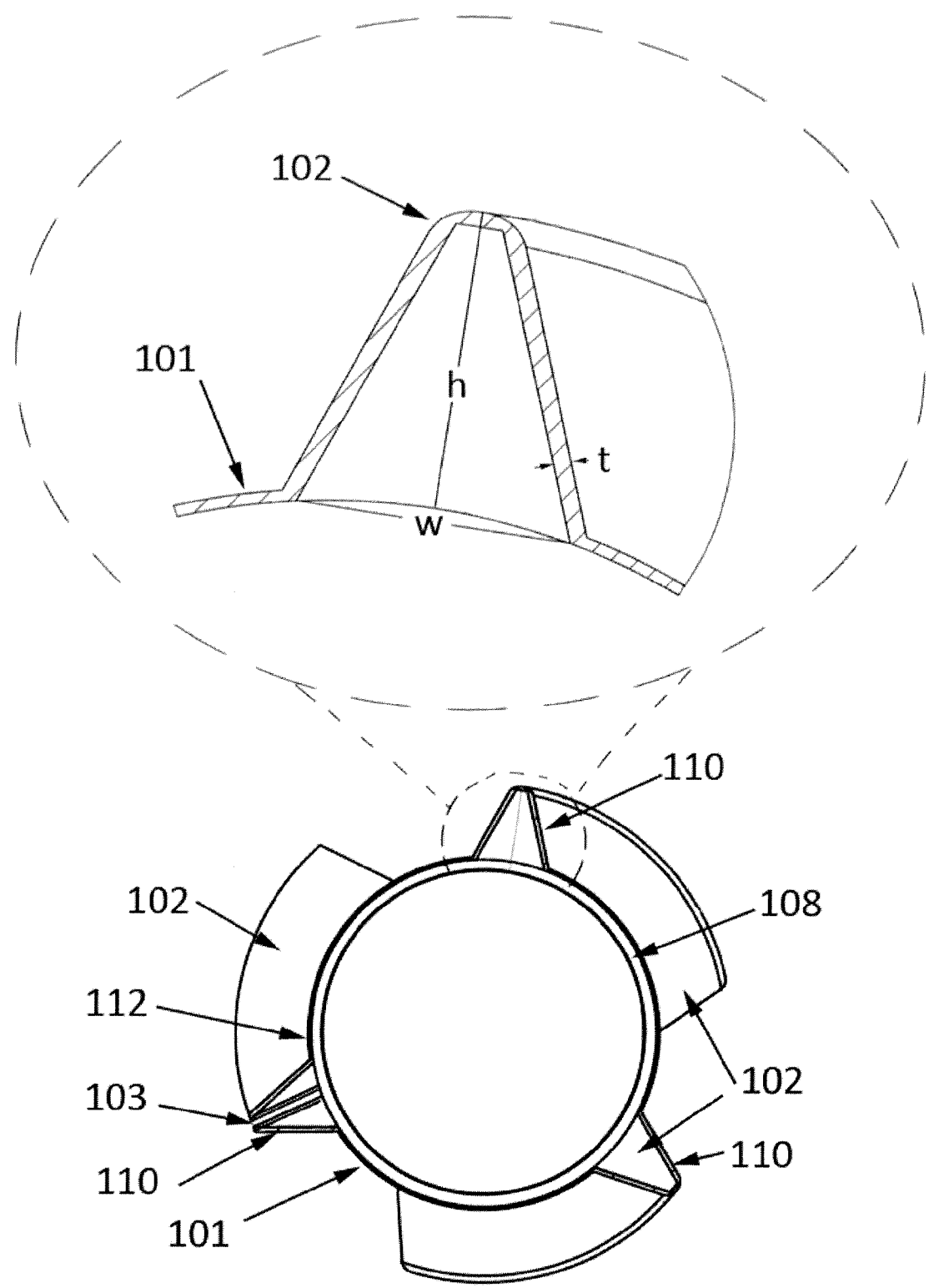
FIG. 1C is a cross sectional view of the helical strake section illustrated in FIG. 1A along line A-A.

Referring to FIG. 1C, this figure is a cross section of FIG. 1A along line A-A. FIG. 1C shows sleeve 112 with strake fins 102.

In this embodiment, fins 102 are shown as hollow structures formed by walls 110. It can be seen from the expanded view that walls 110 may have a thickness (t). The thickness (t) of walls 110 forming fins 102 may vary depending upon how the helical strake section 101 is molded or formed. Representatively, walls 110 may have a thickness (t) of from about 0.125 inches to about 1.0 inch, for example from 0.20 inches to 0.50 inches.

Additionally, fins 102 have a height (h) and a fin base width (w). The height (h) of fins 102 may range from about 5 to about 50 percent of the tubular diameter, preferably from 10 to 30 percent. The width (w) of fins 102 may range from ¼ to 3 times fin height (h), preferably from ⅓ to 1 times height (h). Note that, while a triangular fin 102 cross section is shown, the fin 102 cross section may be any suitable geometry.

Figure 2A:
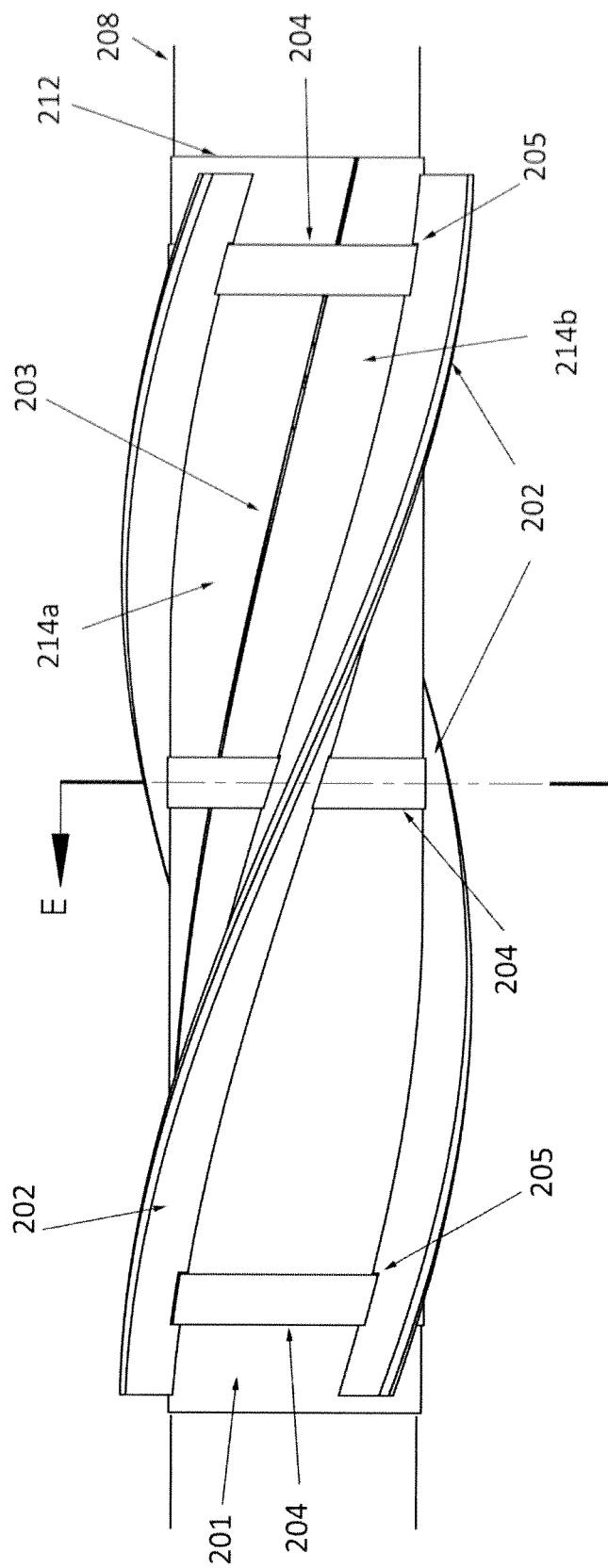
FIG. 2A is a side view of an embodiment of a helical strake section.

FIG. 2A illustrates strake section 201 having strake fins 202 extending from strake sleeve 212. Stake section 201 includes opening 203 formed along strake sleeve 212 so that strake section 201 can be separated into first side 214a and second side 214b and placed around tubular 208. Bands 204 are used to hold strake section 201 onto tubular 208, and optionally tighten sides 214a, 214b together. Slots 205 are formed through base portions of fins 202 to allow bands 204 to be thread through strake fins 202. Representatively, FIG. 2A illustrates an embodiment where each of fins 202 includes three slots 205. It is contemplated, however, that fins 202 may have any number of slots desired to facilitate securing strake section 201 to tubular 208 with bands 204.

Again referring to FIG. 2A, in on embodiment, strake section 201 having strake sleeve 212 and strake fins 202 may be constructed as a single piece as previously discussed in reference to FIG. 1A. Similar to FIG. 1A, opening 203 is helically formed around strake section 201 except, in this embodiment, it is formed along strake sleeve 212, between fins 202. Opening 203 is either formed after fabrication by cutting strake section 201 or created during the molding/forming process. Bands 204 are then inserted through slots 205 and can be set in place prior to installation of strake section 201 around tubular 208. Alternatively, gaps or slots in the strake fins 202 can be created (during molding/forming or cut after molding/forming) to accommodate bands 204. Bands 204 can be inserted into a buckle (or other suitable device) to keep the strake section 201 around the tubular. Bands 204 then may be optionally tightened to keep the strake section 201 clamped around tubular 208. Bands 204, fins 202 and strake sleeve 212 may be coated or imbedded with particles that resist marine fouling. Fins 202, bands 204, and strake sleeve 212 may have appurtenances or coatings that assist with operation or temporary placement of them on the seabed. Strake sleeve 212 may have openings or gaps, in addition to support structures between the section and the tubular, which allows for water to pass or reside between the section and the tubular.

Still referring to FIG. 2A, in some embodiments, it is not necessary for bands 204 to go around the entire circumference of strake section 201. Rather, bands 204 may be sufficiently rigid such that they can be clamped around a portion of tubular 208 to hold strake section 201 to tubular 208. For example, bands 204 may be made of a plastic material having a circular profile and have an opening at one side that allows them to be clamped around tubular 208. Alternatively, bands 204 may have a complete circular profile capable of being tightened against strake fins 202 or other appurtenances on strake section 201 across slots 205.

Any number of bands 204 may be used around strake section 201. Representatively, one or more bands 204 may be used, for example, 2-5 bands 204. The bands may be of any suitable thickness or width, for example from ⅝ inches to 1½ inches in width. Bands 204 may be made of any material having a sufficient strength and flexibility suitable for securing strake section 201 around tubular 208. Representatively, bands 204 may be made of Inconel, synthetics (such as "Smart-Bands™"), composites, aluminum, steel, plastic, or any suitable material.

Figure 2B:
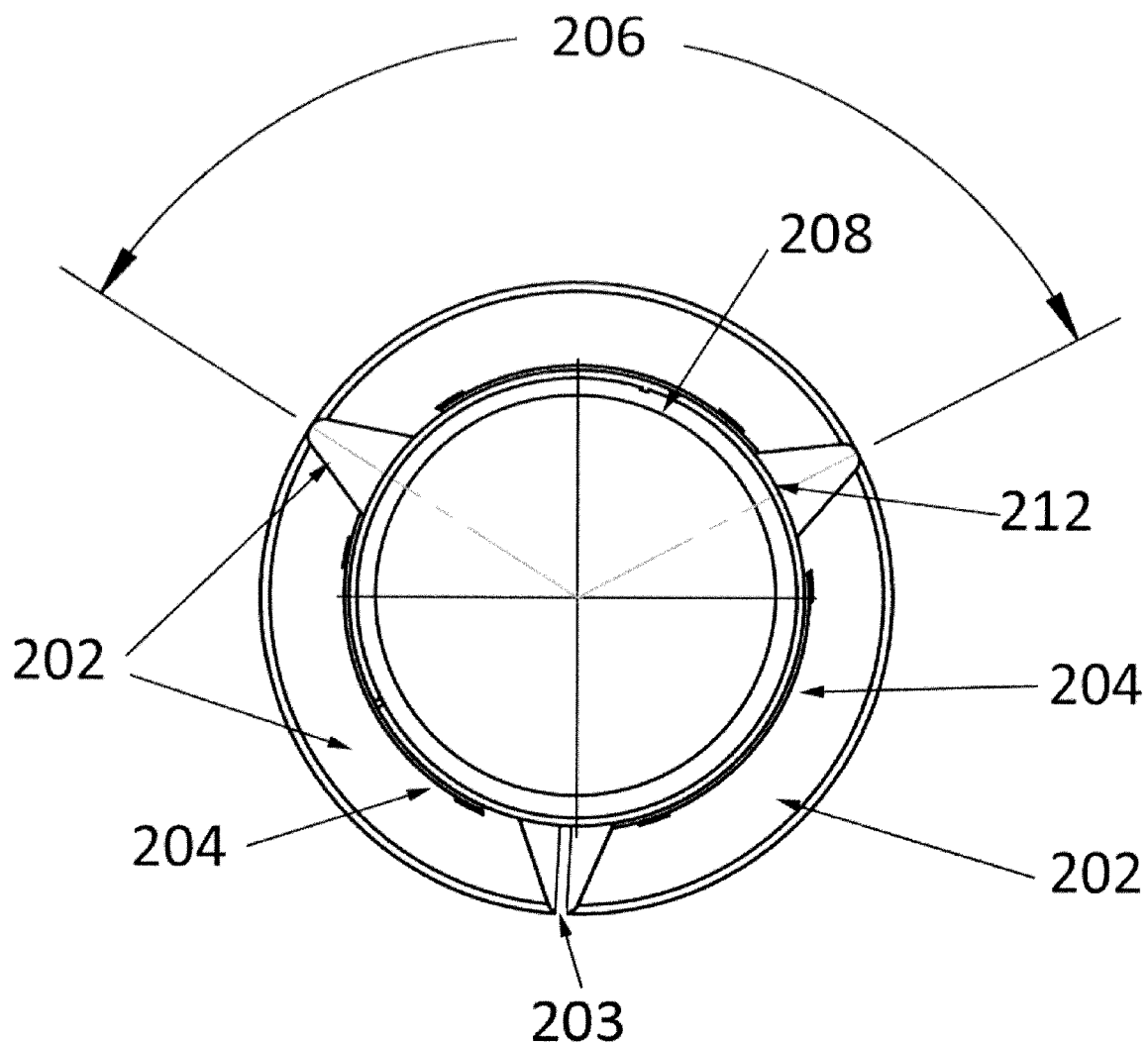
FIG. 2B is an end view of the helical strake section illustrated in FIG. 2A.

Referring to FIG. 2B, which is an end view of FIG. 2A, strake section 201 contains strake fins 202 extending from strake sleeve 212. Bands 204 are used to hold strake section 201 onto tubular 208, and optionally tighten strake section 201 onto the tubular 208. Adjacent strake fins 202 are separated by angle 206. Any number of fins 202 may be used, and adjacent fins 202 may be separated by equal angles or by different angles. Angle 206 may vary from 10 to 360 degrees. For example, angle 106 may vary from approximately 90 to 120 degrees, with an angle of 120 degrees being most preferable.

Figure 2C:
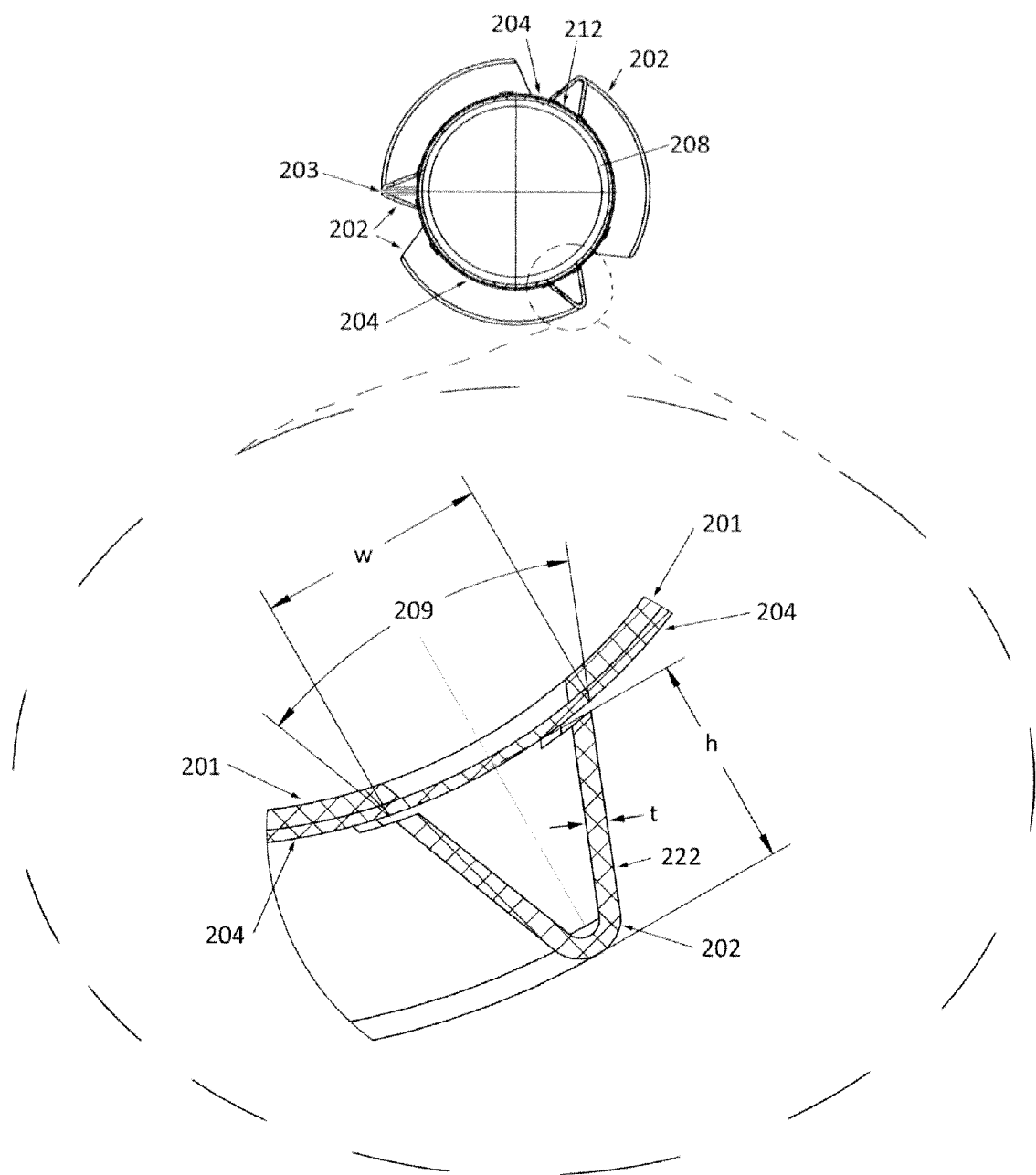
FIG. 2C is a cross sectional view of the helical strake section illustrated in FIG. 2A along line E-E.

Referring to FIG. 2C, this figure is a cross section of FIG. 2A along line E-E. FIG. 2C shows a helical strake section with strake fins 202 and bands 204 that go through strake fins 202 and hold the helical strake section together and, optionally, clamped around a tubular.

In this embodiment, fins 202 are shown as hollow structures. It can be seen from the expanded view that walls 222 may have a thickness (t). The thickness (t) of walls 222 forming fins 102 may vary depending upon how the helical strake section 101 is molded or formed. Representatively, walls 222 may have a thickness (t) of from 0.125 inches to about 1.0 inch, for example from 0.20 inches to 0.50 inches.

Additionally, fins 202 have a height (h), a fin base width (w), and a fin angle 209 formed by walls 222. Band 204 goes through strake fin 202 adjacent to helical strake section 201. Note that, while a trapezoidal fin 202 cross section is shown, the fin 202 cross section may be any suitable geometry.

The height (h) of fins 202 may range from about 5 to about 50 percent of the tubular diameter, preferably from 10 to 30 percent the tubular diameter. The width (w) of fins 202 may range from ¼ to 3 times fin height (h), preferably from ⅓ to 1 times height (h). Fin base angle 209 may vary from 5 to 75 degrees depending upon the fin height (h).

Figure 3:
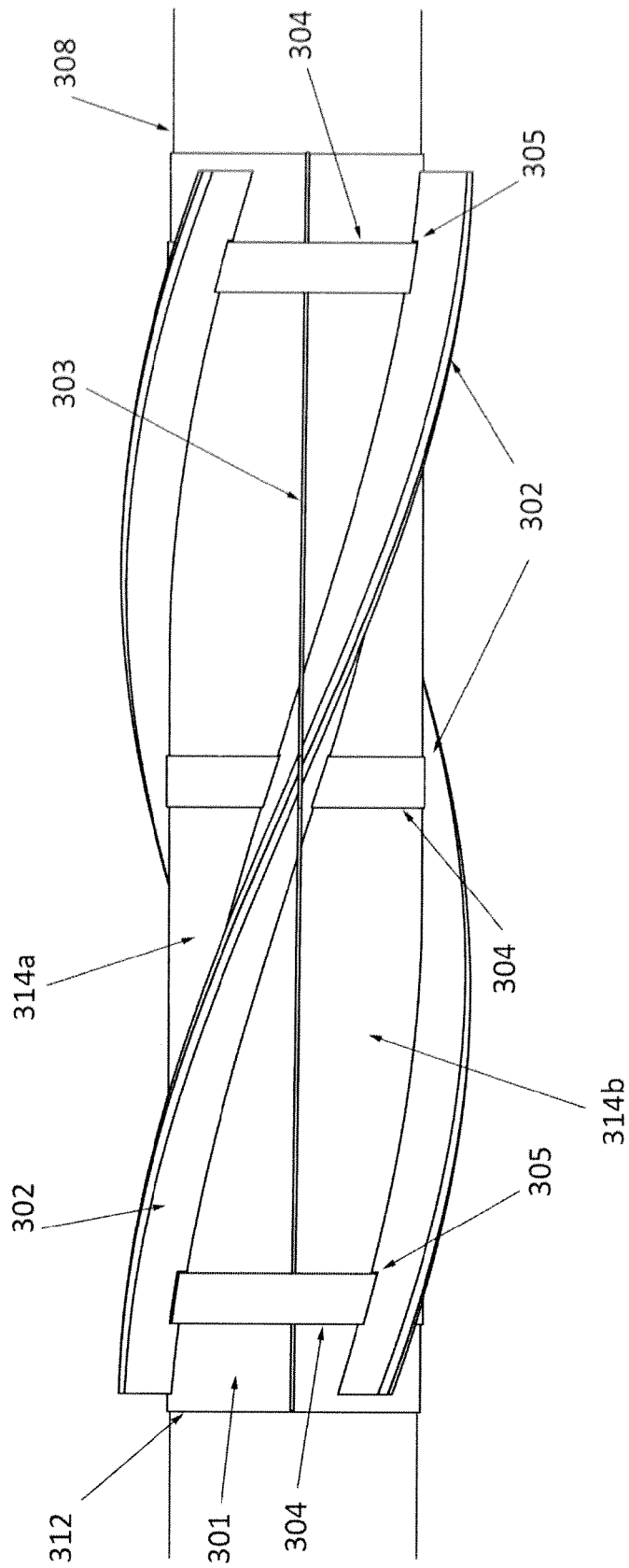
FIG. 3 is a side view of an embodiment of a helical strake section.

Referring to FIG. 3, strake section 301 contains strake fins 302 extending from strake sleeve 312. Strake section 301 may be formed by first side 314a and second side 314b. First side 314a and second side 314b may be separated at opening 303. Strake section 301 having strake sleeve 312 and fins 302 may be similar to strake section 201 and fins 202 described in reference to FIG. 2A except that in this embodiment, opening 303 is substantially linear along the tubular axis. Bands 304 are used to hold strake section 301 onto tubular 308, and optionally tighten strake section 301 onto tubular 308. Slots 305 allow for bands 304 to go through strake fins 302.

Similar to the strake sections previously discussed, strake section 301 having strake fins 302 extending from strake sleeve 312 may be constructed as a single piece, and opening 303 is either cut after fabrication or created during molding/forming. Bands 304 are then inserted through slots 305 and can be set in place prior to installation of the strake section 301. Alternatively, gaps or slots in the strake fins 302 can be created (during molding/forming or cut after molding/forming) to accommodate the bands. Bands 304 can be inserted into a buckle (or other suitable device) to keep the strake section 301 around the tubular. Bands 304 then may be optionally tightened to keep the strake section 301 clamped around tubular 308. Strake section 301 may have openings or gaps, in addition to support structures between the section and the tubular, which allows for water to pass or reside between the section and the tubular.

Still referring to FIG. 3, in some embodiments, it is not necessary for bands 304 to go around the entire circumference of strake section 301. Rather, bands 304 may be sufficiently rigid such that they can be clamped around a portion of tubular 308 to hold strake section 301 to tubular 308 as previously discussed in reference to FIG. 2A. Alternatively, bands 304 may be tightened against strake fins 302 or other appurtenances on strake section 301 across openings 303.

Any number of bands 304 may be used around strake section 301 for example, 2-5 bands may be used. The bands may be of any suitable thickness or width, for example from ⅝ inches to 1½ inches in width. The bands may be made of Inconel, synthetics (such as "Smart-Bands™"), composites, aluminum, steel, plastic or any suitable material.

Figure 4:
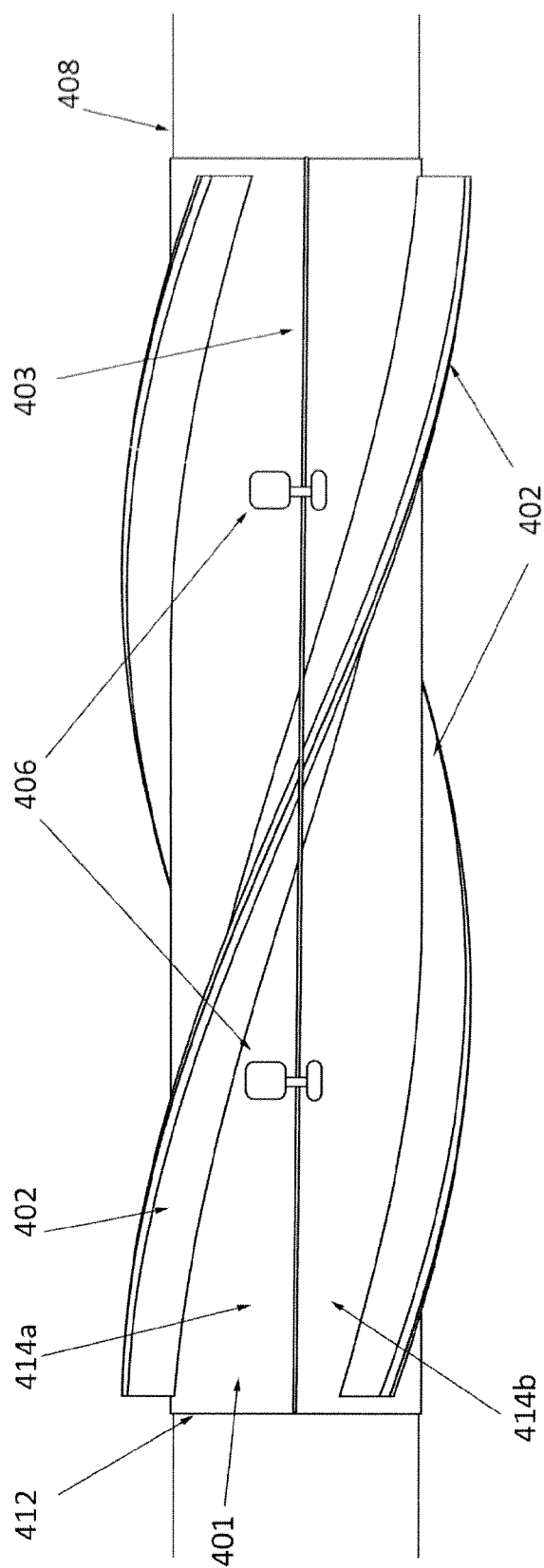
FIG. 4 is a side view of an embodiment of a helical strake section.

Referring to FIG. 4, strake section 401 includes strake fins 402 extending from strake sleeve 412. Strake section 401 may be formed by first side 414a and second side 414b. First side 414a and second side 414b may be separated at opening 403. Opening 403 is utilized to place strake section 401 around a tubular. Opening 403 is similar to opening 303 described in reference to FIG. 3 in that it is substantially linear along the tubular axis of strake sleeve 412. Fastener system 406 is used to attach first side 401a to second side 401b in order to secure strake section 401 around tubular 408. Fastener system 406 may, optionally, be used to tighten strake section 401 around a tubular so that strake section 401 clamps onto the tubular.

Again referring to FIG. 4, strake section 401 having strake fins 402 extending from strake sleeve 412 may be constructed as a single piece, and the opening 403 is either cut after fabrication or created during molding/forming. In this embodiment, fastener system 406 may be used to connect first side 414a to second side 414b and close strake section 401 around tubular 408. Fastener system 406 may be partially created during molding/forming or may be installed after fabrication of strake section 401. Fastener system 406 may be used for any number of installation systems, including surface installation and ROV or diver installation. Fastener system 406, strake fins 402 and strake sleeve 412 may be coated or imbedded with particles that resist marine fouling. Fins 402, fastener system 406, and strake sleeve 412 may have appurtenances or coatings that assist with operation or temporary placement of them on the seabed. Strake section 401 may have openings or gaps, in addition to support structures between the section and the tubular, which allows for water to pass or reside between the section and the tubular. Fastener system 406 may consist of any number and type of fasteners including, but not limited to, brackets, bolts, pins, nuts, screws, rivets, ropes, cables, tie-wraps, chemical bonds, and welds.

Figure 5:
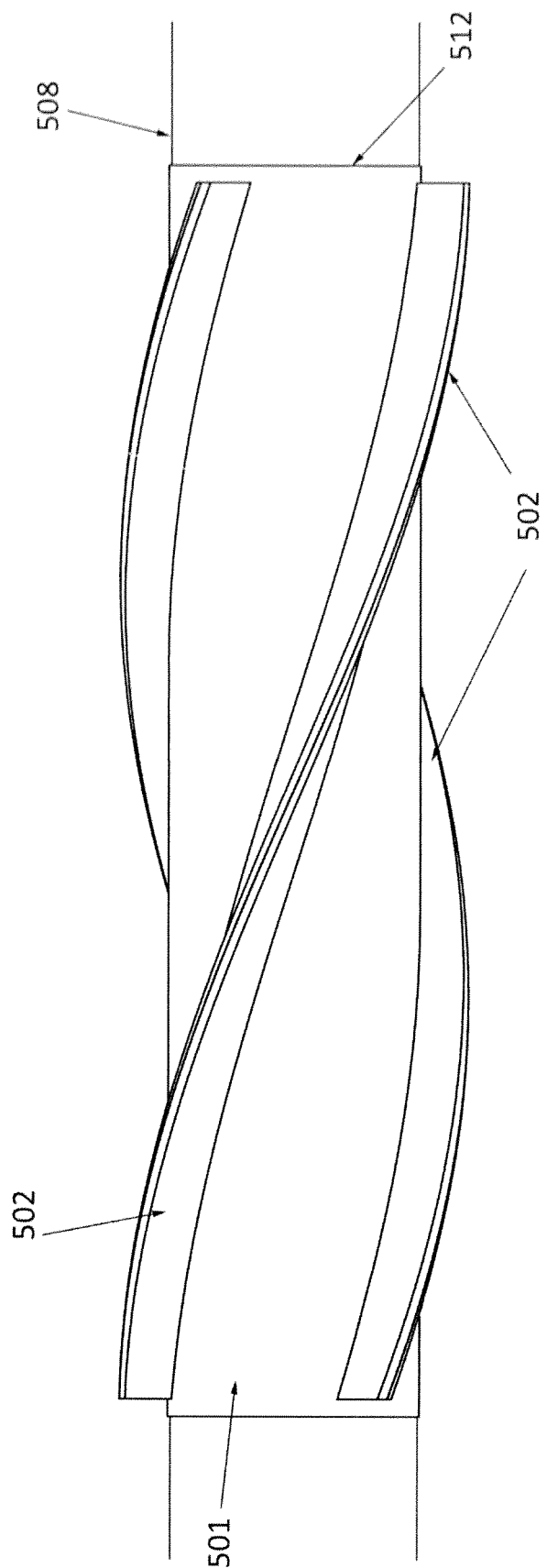
FIG. 5 is a side view of an embodiment of a helical strake section.

Referring to FIG. 5, strake section 501 includes strake fins 502 similar to strake fins 302 illustrated in reference to FIG. 3. Other aspects, such as the size, shape and dimensions of strake section 501 and its associated components are similar to those described in reference to FIGS. 1-4. In this embodiment, an opening to facilitate positioning of strake section 501 around tubular 508 as previously discussed is omitted. Instead, strake section 501, with strake fins 502, is installed by sliding strake section 501 over the end of tubular 508.

In some embodiments, strake sleeve 512 and strake fins 502 may be integrally formed as a single structure, such as by an extrusion process as previously discussed. Alternatively, strake fins 502 may be formed separately from strake sleeve 512 and may be attached to strake sleeve 512 by any suitable means, including, but not limited to, brackets, bolts, pins, nuts, screws, rivets, ropes, cables, tie-wraps, chemical bonds, and welds. Strake sleeve 512 and strake fins 502 may be made of the same material or of different materials. Materials for construction may include metals, plastics, composites, synthetics, or any suitable material.

Figure 6:
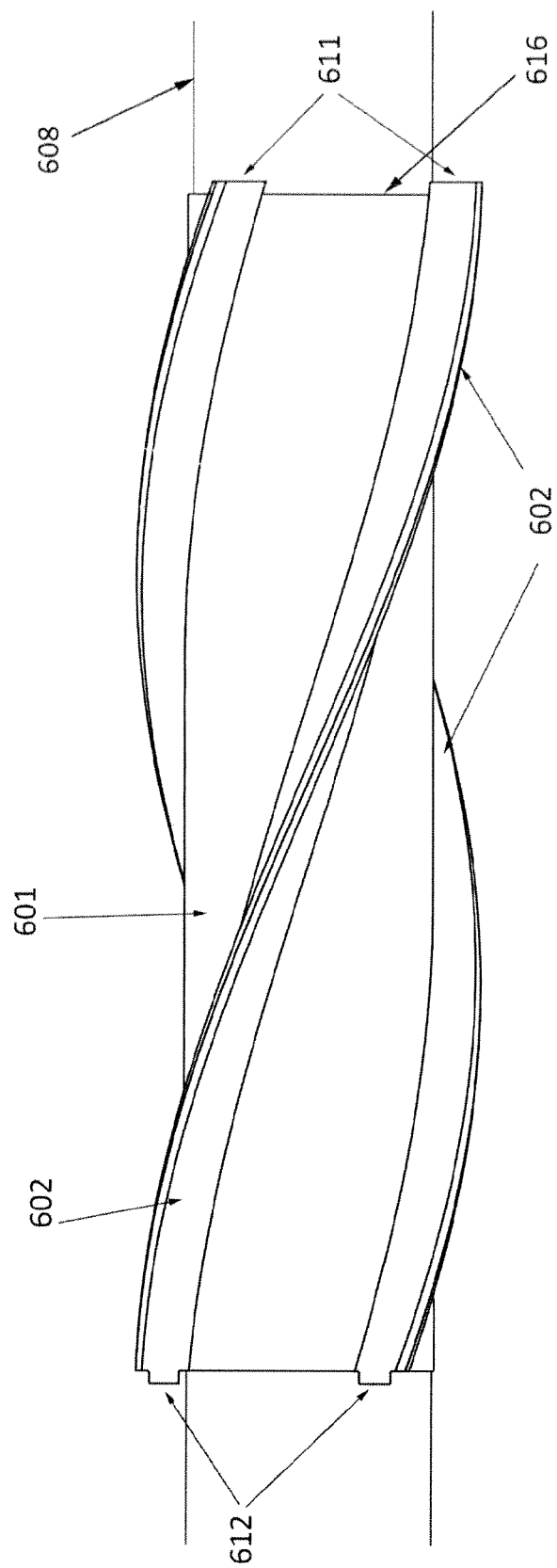
FIG. 6 is a side view of an embodiment of a helical strake section.

Referring to FIG. 6, strake section 601 includes strake fins 602 extending from strake sleeve 616. Strake section 601 may be substantially similar to strake section 501 described in reference to FIG. 5, except that in this embodiment, alignment members 611, 612 are formed at ends of fins 602 to help align abutting ends of fins 602 with one another. In one embodiment, alignment members are a female opening 611 or a male extension 612 formed at the end of one or more of strake fins 602. Adjacent strake sections can be mated by utilizing the female openings 611 and male openings 612.

Figure 9:
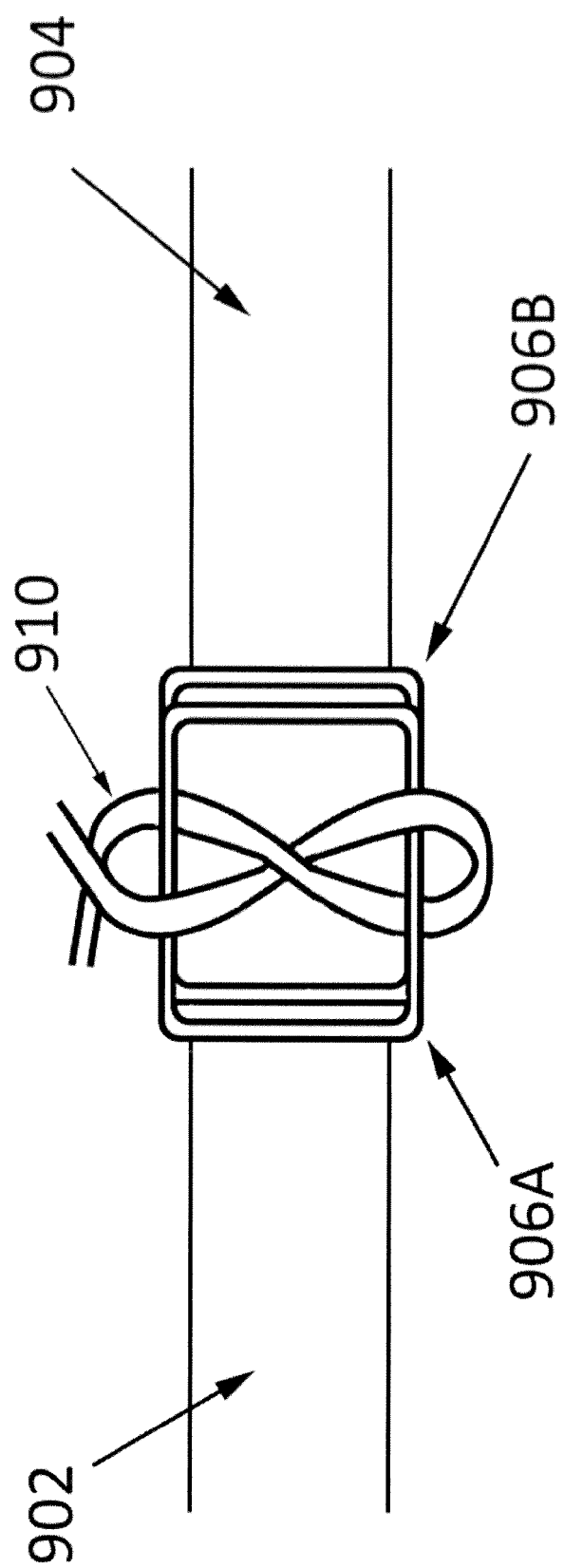
FIG. 9 is a side view of an embodiment of abutting helical strake sections joined together in an end to end configuration.

Still referring to FIG. 6, while this figure shows male and female appurtenances on the strake fins used to align adjacent strake sections (or to fix a strake section against another appurtenance), other mechanisms for aligning adjacent sections may be used in addition to the male and female appurtenances or in place of them. Examples include nuts, bolts, clamps, clips, pins, guides, brackets, or any suitable device or mechanism. FIG. 9 illustrates another embodiment of an alignment member.

Figure 7:
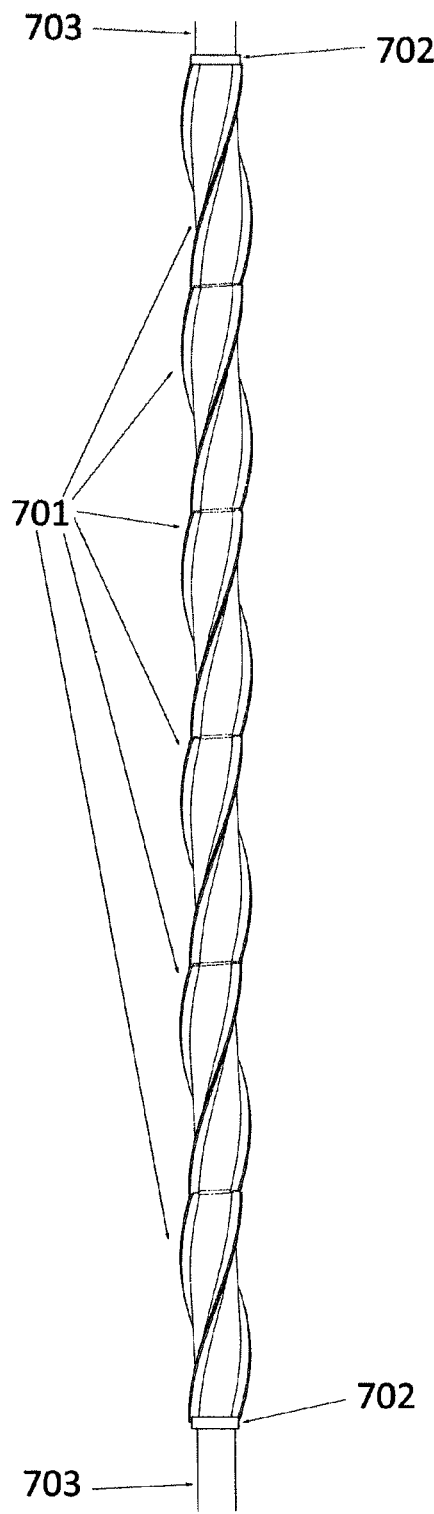
FIG. 7 is a side view of an embodiment of a tubular fitted with several helical strakes sections which are aligned together.

FIG. 7 illustrates a set of strake sections 701 assembled along tubular 703. Strake sections 701 may be placed around tubular 703 as previously discussed and kept in place by collars 702 positioned at opposite ends of the set of strake sections 701. Collars 702 may be collars such as those commercially available from VIV Solutions LLC. Collars 702 clamp around tubular 703 to restrain sliding of strake sections 701 along tubular 703.

Strake sections 701 may fit tightly around tubular 703 or may be loose on tubular 703 but fastened so that they do not come off of tubular 703. Strake sections 701 may be attached to each other so that they act as a single unit. For example, each of strake sections 701 may have a female opening and a male extension at opposite ends such that when strake sections 701 are positioned end to end along tubular 703 the female opening and male extension connect with one another to attach strake sections 701 to one another. Collars 702 are clamped tightly around tubular 703. If collars 702 are connected to strake sections 701 so that the strake sections 701 cannot rotate relative to collars 702, and if strake sections 701 are connected to each other (e.g. using an appurtenances such as shown in FIG. 6), then the entire strake assembly is rigid in that it cannot rotate or slide axially along tubular 703.

Still referring to FIG. 7, any number and combination of collars 702 and strake sections 701 may be used. The strake sections 701 may be rigidly attached to collars 702 or free to rotate within a range of angles. The strake sections and collars may be of any length, size, or suitable geometry.

Strake sections 701 and collars 702 may be made of any suitable material including, but not limited to, metals, plastics, composites, wood, synthetics, and glass. Strake sections 701 and collars 702 may be made of the same material or of different materials, and not all strake sections need to necessarily be made of the same material.

Figure 8:
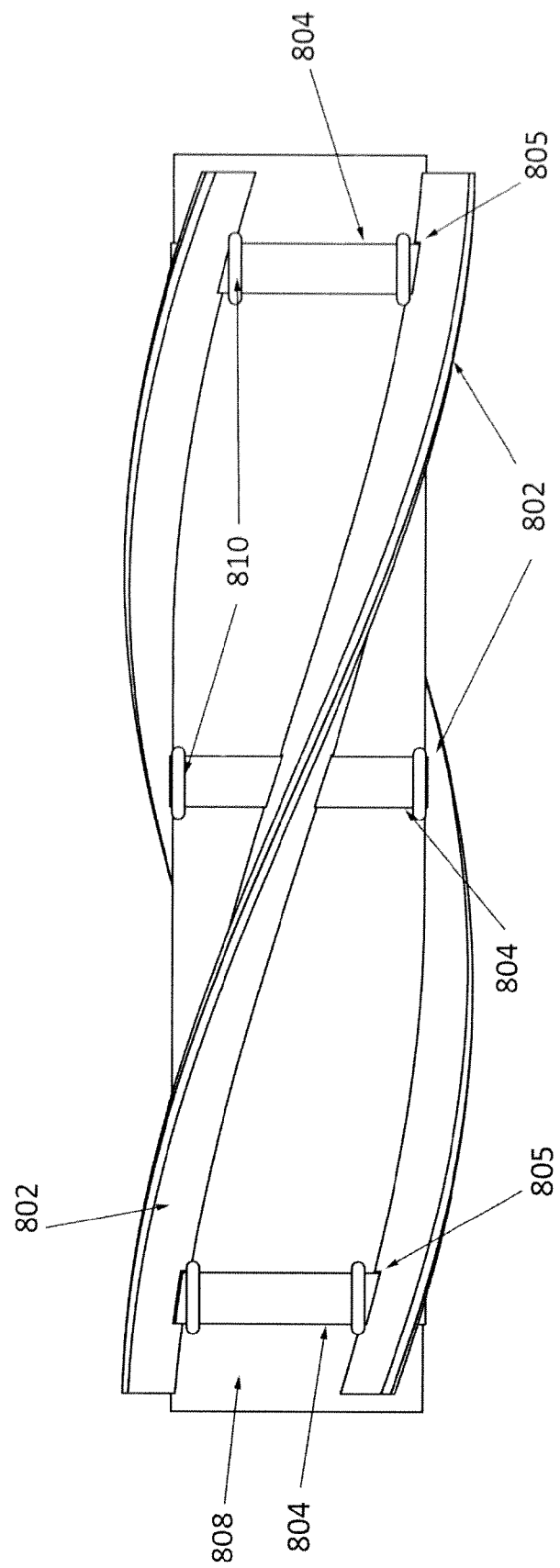
FIG. 8 is a side view of an embodiment of a helical strake section.

FIG. 8 illustrates an embodiment in which strake fins 802 are wrapped helically around tubular 808 in the absence of a strake sleeve. Since a strake sleeve is omitted, a position of each of fins 802 around tubular 808 is independently modifiable, in other words a distance between adjacent fins 802 can be changed. According to this embodiment, strake fins 802 may be rigid and have a helical shape which conforms to the outer diameter of tubular 808 in the absence of a strake sleeve. In some embodiments, bands 804 may be inserted through slots 805 within fins 802 or placed over the top of fins 802 to hold fins 802 to tubular 808 as previously discussed. Bands 804 may allow for improved stability in the placement of strake fins 802 around tubular 808. Alternatively, strake fins 802 may be sufficiently rigid and have a sufficient helical angle such that they are capable of independently attaching to tubular 808 in the absence of bands 804 and bands 804 may be omitted.

It is noted that although the strake sleeve is omitted, it is still important for a position of fins 802 around tubular 808 to be maintained. For example, as previously discussed, in some embodiments fins 802 are separated by an angle of from 10 to 360 degrees. In embodiments where bands 804 are included, positioning members 810 may be attached to bands 804 along side fins 802 in order to prevent fins 802 from sliding along bands 804. In some embodiments, positioning members 810 may be clips that attach fins 802 to bands 804 at the desired location. Alternatively, positioning members 810 may be stoppers or nubs extending from a portion of the band surface adjacent slots 805 in order to prevent fins 802 from sliding along bands 804. Since positioning members 810 prevent fins 802 from sliding along bands 804 and in turn around tubular 808, a spacing can be maintained between adjacent fins 802. In embodiments where bands 804 are omitted, a spacing between fins 802 may be maintained by bolting fins 802 to tubular 808 at predetermined distances from one another. Other ways of maintaining the spacing between fins 802 in the absence of bands 804 may include using collars that hold fins in the desired position around tubular 808 or applying a coating over fins 802 and tubular 808. A suitable coating may be, for example, an epoxy or the like. In still further embodiments, it is contemplated that fins 802 may be sufficiently rigid (e.g. made of plastic as opposted to polyurethane) and have a helical diameter which matches that of tubular 808 such that they can be wrapped tight enough around tubular 808 to independently maintain the desired position using frictional forces.

Fins 802 may be placed around tubular 808 with or without bands 804 by coiling fins 802 around tubular 808 until the entire fin length is wrapped around tubular 808 at the desired position. The spacing between fins 802 around tubular 808 may be preset before tubular 808 is placed in the water or set once tubular 808 is under water. A tubular can be installed at sea from a floating vessel using a J-lay configuration where the tubular is held vertically on the vessel and dropped vertically into the water and then when it reaches the bottom of the body of water, it lays horizontal. Alternatively, tubulars can be installed in a S-lay configuration where the structural element is held horizontally on the vessel, passes over a stinger, drops to vertical through the body of water, and then rests on the bottom of the body of water in a horizontal configuration. In the case of the S-lay configuration, pulling of suppression devices (e.g. fins 802) attached to the tublar over the stinger can be difficult. Thus, in one embodiment, fins 802 may be bundled together along one side of a portion of tubular 808 leaving the opposite side free to be pulled over the stinger and down into the water. Once tubular 808 is under water, an ROV may pull the bundled fins 802 apart and position them around tubular 808 as desired.

Still referring to FIG. 8, strake fins 802 may be of any desired cross section providing a sufficiently bluff profile. The cross section may be triangular, trapezoidal, circular, square, rectangular, or any other desired shape. In most cases, the sides of the cross section will not be parallel and often will not be straight. For example, the base of strake fins 802 may be curved to match the surface of the tubular 802. Bands 804 may have similar properties to the bands described above in reference to FIG. 2A. Bands 804 may consist of simple structures such as tie-wraps, cable, or rope, or may consist of more sophisticated structures such as Smart-Bands™ or Inconel bands that are installed with a special tool. Strake fins 802 may have appurtenances on them to accommodate bands 804.

Strake fins 802 may also have strengthening members for the slots through which bands 804 travel. Strake fins 802 may have other appurtenances on them for alignment of adjacent strake fins 802 or for attaching the strake fins 802 to other structures such as collars. The bands 804 may be pre-installed through the strake fins 802, and optional clamps or clips may be used to keep the bands in place. Strake fins 802 may be of solid cross section or of a hollow cross section. Strake fins 802 may be continuous or have gaps or perforations within a single fin or between adjacent fins. Strake fins 802 may be made in any suitable length. For some applications, it will be optimal to build strake fins 802 in a length ranging from about 2 to about 20 feet, for example, from 5 to 10 feet, but for other applications longer lengths may be more suitable. The optimal length of strake fins 802 is a function of installation method, size, geometry, materials and fabrication methods.

Still referring to FIG. 8, strake fins 802 may be made of one or more of any number of suitable materials, including rubbers such as polyurethane and neoprene, plastics, composite, synthetics, woods, metals, fiberglass, spectra, or exotic materials. In one embodiment, strake fins 802 may be formed from an extrusion process and extruded into the desired helical shape. As previously discussed, extruding fins 802 into the helical form, as opposed to processes in which the fins are formed as straight pieces and then later bent around a tubular, reduces manufacturing costs and time. In addition, strake fins 802 may be molded into the helical shape using a rotational molding or injection molding process. Although extrusion, rotational molding and injection molding processes are described, it is further contemplated that strake fins 802 may be made from any other suitable molding or forming process (e.g. a vacuum forming process), or a hybrid of one or more processes.

For example, part of a single strake fin may be made by one process and another part of a single strake fin may be made by another process. Strake fins 802 may be fabricated individually or fabricated as a group and then separated as will be discussed in more detail in reference to FIG. 12. Strake fins 802 may be quite flexible or may be quite stiff. Strake fins 802 may optionally be attached to tubular 808 by chemical bonding, mechanical attachment, or by any suitable means, and bands 804 omitted.

Materials may be placed under strake fins 802 or bands 804 to provide a "cushioning" effect that provides accommodation of shrinkage of the tubular outside diameter. Springs, washers or other structures may be placed in line with bands 804 to also provide accommodation of shrinkage of the tubular outside diameter. Bands 804 and fins 802 may be coated or embedded with particles that resist marine fouling. Bands 804 and fins 802 may have appurtenances or coatings that assist with operation or temporary placement of them on the seabed.

FIG. 9 illustrates a side view of another embodiment of an alignment member for aligning ends of adjacent fins with one another. As previously discussed, fins are arranged along an underlying tubular in an end to end helical configuration as illustrated in FIG. 7. In embodiments where the strake sleeve is omitted such as FIG. 8, it may be difficult to maintain alignment between abutting ends of the fins. FIG. 9 illustrates an embodiment in which adjacent ends of fin 902 and fin 904 include an alignment member 906*a*, 906*b*, respectively, to help align the ends and hold them together to form a more continuous helix around the underlying tubular. In this embodiment, alignment members 906*a*, 906*b* may be loops that extend from the ends of fins 902, 904, respectively, and overlap once fins 902, 904 are aligned in an end to end configuration as illustrated. A band, rope or other device 910 may then be inserted through the loops to hold them together. Although not shown, it is contemplated that each end of fins 902, 904 may include an alignment member.

Alignment members 906*a*, 906*b* may be made of any desired shape or cross section to accept a band. Alignment members 906*a*, 906*b* may have the same or different shapes and dimensions. By making strake fin sections 902 and 904 with alignment members 906*a*, 906*b* at each end, any number of strake fin sections 902 and 904 may be made to be identical. Alignment members 906*a*, 906*b* may be part of the strake fins 902, 904 or may be separate structures that are attached to strake fins 902, 904 by any suitable attachment means (e.g. bolts, screws, etc). Attachment members 906*a*, 906*b* may have sufficient depth or rigidity to provide substantial support for a band. Alignment members 906*a*, 906*b* may be made of any desired material including, but not limited to, metal, plastic, rubber, synthetic, composite, or of multiple materials.

Figure 10:
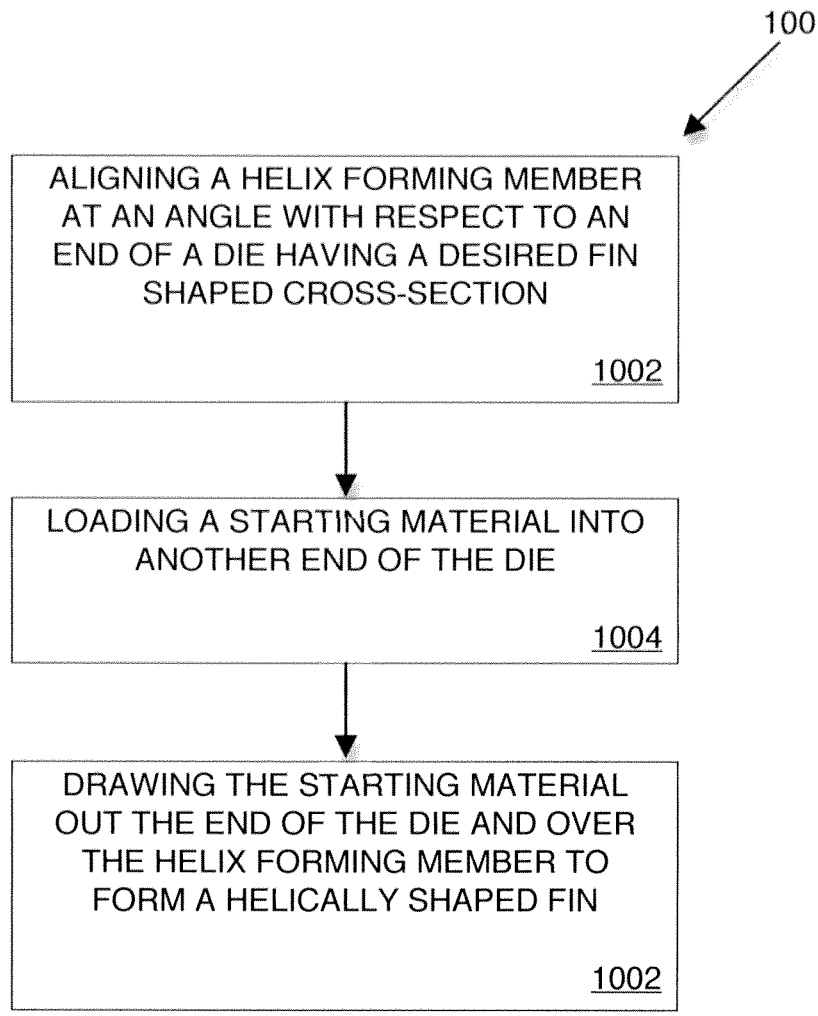
FIG. 10 is a flowchart of a process for forming fins.
Figure 11:
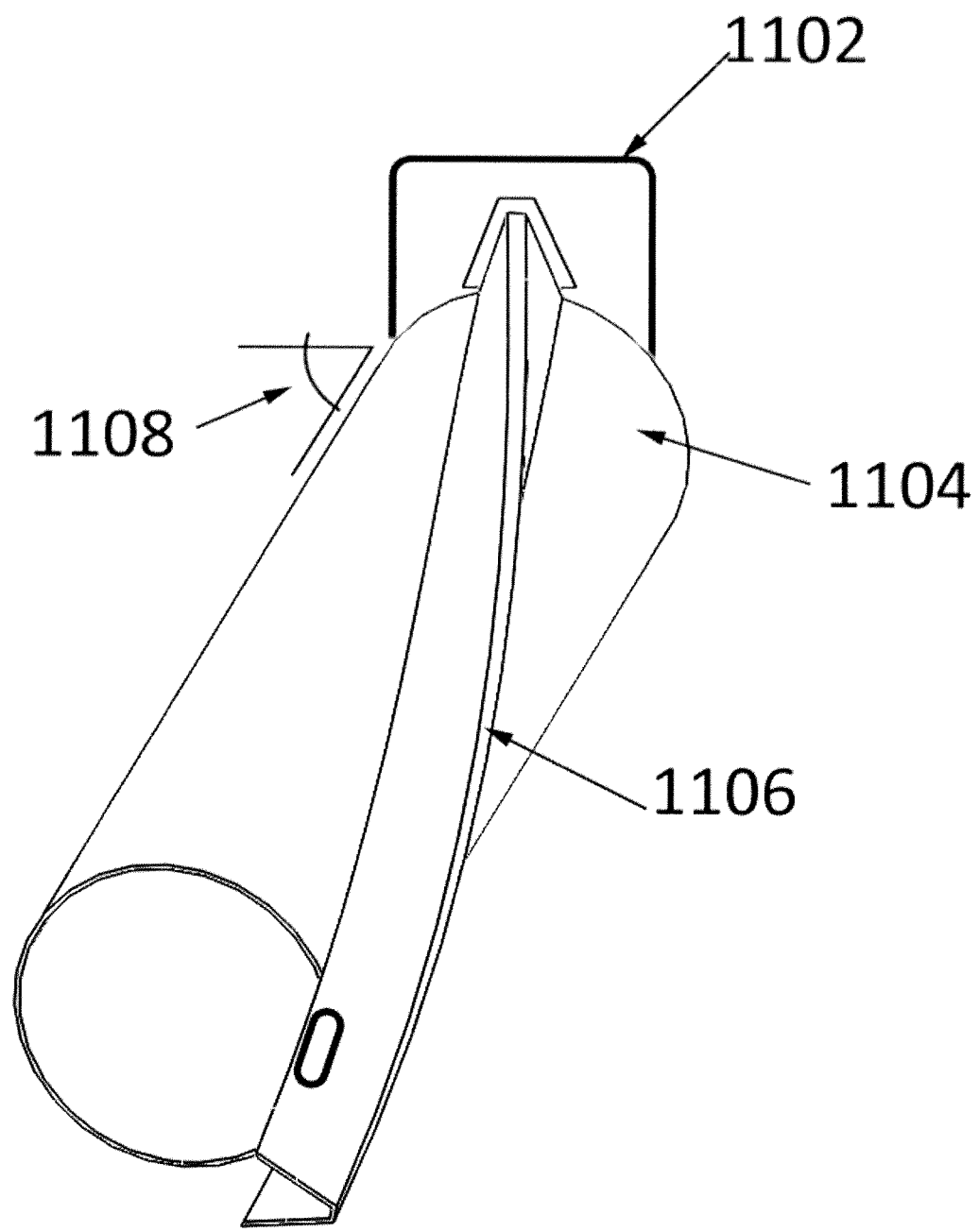
FIG. 11 is a perspective view of an embodiment of a fin formed by the process illustrated in FIG. 10.

FIG. 10 is a flowchart of a process for forming fins. In this embodiment, fin forming process 100 is an extrusion process for helically forming one or more fins. In this aspect, a helix forming member is aligned at an angle to an end of a die (block 1002). The Die has a cross-section in the shape of one or more fins. In some embodiments, the helix forming member may be, for example, a cylindrical tube with a diameter substantially equivalent to the tubular around which the fin is intended to be fitted. The cylinder is positioned at an angle with respect to the end of the die so that when the starting material is loaded into the die (block 1004) and drawn out the end of the die onto the cylinder, the fin cools in the shape of a helix (block 1006). The angular orientation of the helix forming member with respect to the die is illustrated in FIG. 11. In this embodiment, helix forming member is a cylinder 1104. In particular, cylinder 1104 is oriented at an angle 1108 with respect to die 1102. Angle 1108 may be, for example, from about 45 degrees to about 85 degrees, more preferably from 55 degrees to 80 degrees. When fin 1106 is drawn out of die 1102 it helically wraps around cylinder 1104 and cools into a helical shape. As previously discussed, the material of fin 1106 may be a substantially rigid and inflexible material such as a polymer or metal that independently retains the helical shape when fin 1106 is removed from cylinder 1104.

Figure 12:
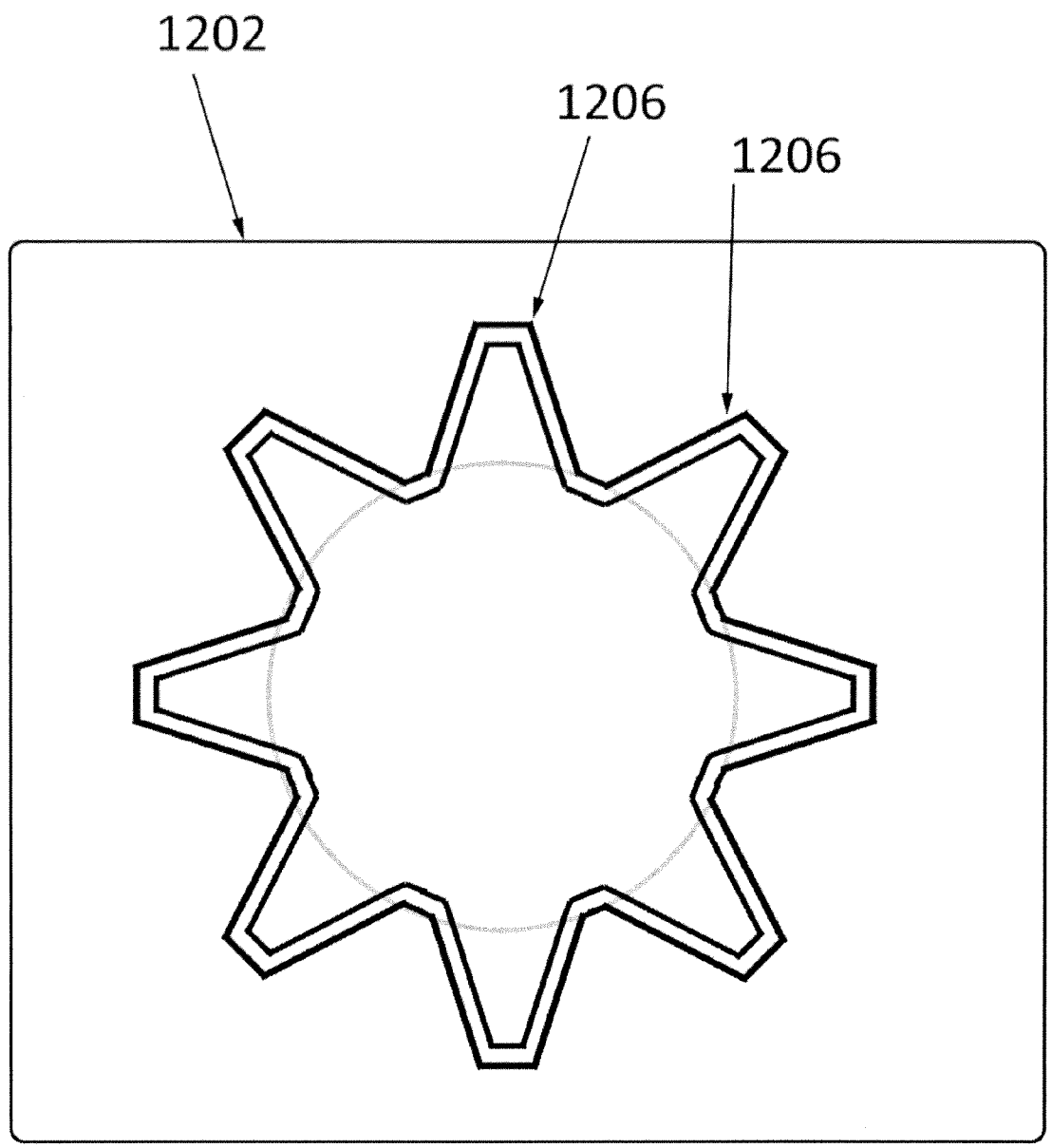
FIG. 12 is an end view of another embodiment of a die for forming a plurality of fins.

In some embodiments, in addition to, or instead of positioning cylinder 1104 at an angle to achieve a helically shaped fin 1106, cylinder 1104 and die 1102 are rotated with respect to one another. In this aspect, as the starting material is drawing through die 1102 it is pulled around cylinder 1104 to achieve the desired helical shape. The above-described extrusion process may be used to form fin 1106 without an underlying sleeve or an integrally formed fin and sleeve configuration such as those previously discussed. For example, die 1102 may have a cross-sectional shape of a fin extending from a hollow sleeve such that when the starting material is drawn through the die, the resulting product is an integrally formed strake section having a fin extending from a sleeve. In addition, although formation of a single fin 1106 is illustrated in FIG. 11, it is further contemplated that more than one fin can be formed using one or more of the processes previously discussed (e.g. extrusion, rotational molding, injection molding or vacuum forming). For example, in some embodiments die 1202 may have the cross-sectional shape of a plurality of fins in a side by side configuration as illustrated by FIG. 12. In this aspect, when the starting material is drawn through the die as previously discussed, a ring of helically shaped fins 1206 is formed. Fins 1206 may then be separated from one another prior to installation. It is contemplated that anywhere from about 8 to about 12 fins 1206 may be formed at one time, depending upon the width of each fin.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For example, strake fins may consist of a single structural member, multiple members each running helically along tubular, one or more members running helically along a tubular and multiple segments attached to the helical members, or only multiple segments along a tubular. In addition, a strake fin may consist of a rope, cable rod, tube, or other structure and multiple segments of plastic, rubber, or other material that surround, or are attached to, the rope, cable, rod or tube, similar to beads being strung onto a string. Another example is that a strake fin may consist of two different structures that are coupled together so that the strake fin has a composite cross section. A further example is a hollow strake fin made of one material, and then filled with a different material to give it improved strength, buoyancy, or any other desired property. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention claimed is:

1. An apparatus comprising:
   a strake section having a plurality of helical fins, each of the plurality of helical fins separated from one another by at least one helical opening such that a circumferential distance between each of the plurality of helical fins can be modified to accommodate an underlying tubular diameter;
   a slot formed through a base portion of one or more of the plurality of helical fins;
   a belt positioned through the slot and dimensioned to hold the one or more helical fins to an underlying structure; and
   a positioning member attached to the belt and dimensioned to maintain a circumferential distance between at least two of the plurality of helical fins positioned around the underlying tubular structure, and
   wherein a helical shape of each of the helical fins is fixed and conforms to an outer diameter of the underlying tubular such that each of the helical fins is capable of attaching itself around the underlying tubular and maintaining a desired position using frictional forces between each of the helical fins and the underlying tubular.

2. The apparatus of claim 1 wherein the plurality of helical fins are attached to a cylindrical strake sleeve and the helical opening is formed around the strake sleeve between adjacent helical fins.

3. The apparatus of claim 1 wherein the plurality of helical fins are attached to a cylindrical strake sleeve and the helical opening is formed along a lengthwise dimension of at least one of the plurality of helical fins.

4. The apparatus of claim 1 wherein the plurality of helical fins are dimensioned to independently attach to an underlying cylindrical structure.

5. The apparatus of claim 1 wherein opposite ends of at least one of the plurality of helical fins have complimentary mating components capable of mating with abutting strake sections.

6. An apparatus comprising:
   a helical strake section having a plurality of helical fins extending from a strake sleeve, each of the plurality of helical fins separated from one another by at least one helical opening such that a circumferential distance between each of the plurality of helical fins can be modified to accommodate an underlying tubular diameter; and
   a loop member extending from each of the ends of the plurality of helical fins, each loop member capable of being attached to another loop member extending from a helical fin of an abutting strake section so as to connect the helical fins of each of the strake sections to one another, and
   wherein a helical shape of each of the helical fins is fixed and conforms to an outer diameter of the underlying tubular such that each of the helical fins is capable of attaching itself around the underlying tubular and maintaining a desired position using frictional forces between each of the helical fins and the underlying tubular.

7. The apparatus of claim 6 wherein the helical fins are integrally formed with the cylindrical strake sleeve.

8. A method of extruding a helically shaped fin comprising:
   aligning an end of a tubular helix forming member in front of an end of a die having a desired cross-sectional shape, wherein the helix forming member is aligned such that the helix forming member extends longitudinally away from the end of the die in a direction of material extrusion from the die and forms an angle with the die; and
   drawing a heated starting material out of the end of the die and over the helix forming member in a longitudinal direction to form a helically shaped fin that independently maintains the helical shape once cooled.

9. The method of claim 8 wherein forming comprises integrally forming the helically shaped fin with a cylindrical strake sleeve.

10. The method of claim 8 wherein the helically shaped fin is formed from a plastic starting material.

11. The method of claim 8 wherein the helix forming member is a cylinder.

12. The method of claim 8 wherein forming comprises forming a plurality of helically shaped fins simultaneously.

13. The apparatus of claim 1 wherein at least one of the plurality of helical fins is coated or embedded with particles that resist marine fouling.

14. An apparatus comprising:
   a strake section having a plurality of helical fins, each of the plurality of helical fins separated from one another by at least one helical opening such that a circumferential distance between each of the plurality of helical fins can be modified to accommodate an underlying tubular diameter; and
   a band capable of securing the plurality of helical fins around the underlying tubular without completely encircling the underlying tubular, wherein a helical shape of each of the helical fins is fixed and conforms to an outer diameter of the underlying tubular such that each of the helical fins is capable of attaching itself around the underlying tubular and maintaining a desired position using frictional forces between each of the helical fins and the underlying tubular.

15. The apparatus of claim 1 further comprising:

a coating applied over each of the plurality of helical fins and the underlying tubular to maintain a position of the helical fins about the underlying tubular.

16. An apparatus comprising:

a strake section having a plurality of helical fins, each of the plurality of helical fins separated from one another by at least one helical opening such that a circumferential distance between each of the plurality of helical fins can be modified to accommodate an underlying tubular diameter; and a cushioning material attached to a base portion of at least one of the plurality of helical fins so as to accommodate changes in a diameter of the underlying tubular when the at least one of the plurality of helical fins is attached to the underlying tubular, wherein a helical shape of each of the helical fins is fixed and conforms to an outer diameter of the underlying tubular such that each of the helical fins is capable of attaching itself around the underlying tubular and maintaining a desired position using frictional forces between each of the helical fins and the underlying tubular.

17. The apparatus of claim 1 further comprising:

a cushioning structure placed in line with the belt to accommodate changes in a diameter of the underlying tubular when at least one of the plurality of fins is attached to the underlying tubular.

* * * * *